United States Patent [19]

Hait

[11] Patent Number: 4,545,359
[45] Date of Patent: Oct. 8, 1985

[54] OUTDOOR STOVE

[75] Inventor: Paul W. Hait, Los Gatos, Calif.

[73] Assignee: Pyromid, Inc., Saratoga, Calif.

[21] Appl. No.: 465,307

[22] Filed: Feb. 9, 1983

[51] Int. Cl.[4] .............................................. F24C 1/16
[52] U.S. Cl. ....................................... 126/9 R; 126/29
[58] Field of Search ................ 126/9 R, 9 D, 9 B, 29, 126/3 D

[56] References Cited

U.S. PATENT DOCUMENTS

| | | | |
|---|---|---|---|
| 1,090,045 | 3/1914 | Gladden | 126/215 |
| 1,102,649 | 7/1914 | Dix | 126/9 B |
| 1,247,806 | 11/1917 | Ferdon | 126/38 |
| 1,357,697 | 11/1920 | Adams | 126/29 |
| 1,396,059 | 11/1921 | Reppetto | |
| 1,403,842 | 1/1922 | Chambers | 126/30 |
| 1,436,937 | 11/1922 | Boyles | 126/29 |
| 1,438,345 | 12/1922 | Tait et al. | 126/9 R |
| 1,651,818 | 12/1927 | Gorrell | 126/30 |
| 2,511,515 | 5/1950 | Schmitt | 126/9 R |
| 2,541,265 | 12/1951 | McGregor | 126/215 |
| 2,576,750 | 11/1951 | Clark | 126/9 R |
| 2,943,557 | 7/1960 | Suehlsen | 99/421 |
| 2,985,164 | 5/1961 | Imoto | 126/25 |
| 3,005,451 | 10/1961 | Richart | 126/25 |
| 3,062,128 | 11/1962 | Louthan | 99/446 |
| 3,068,852 | 12/1960 | Purtzer | 126/9 R |
| 3,103,160 | 9/1963 | Forniti et al. | 99/339 |
| 3,428,039 | 2/1969 | Desmoulins | 126/9 |
| 3,693,534 | 9/1972 | Martin | 126/260 |
| 3,765,397 | 10/1973 | Henderson | 126/25 |
| 3,809,051 | 5/1974 | Giroux | 126/9 R |
| 3,880,139 | 4/1975 | Young | 126/9 R |
| 4,140,099 | 2/1979 | Newport | 126/9 |

FOREIGN PATENT DOCUMENTS 1527842 6/1968 France .

Primary Examiner—William E. Lyddane
Assistant Examiner—Gerald Anderson
Attorney, Agent, or Firm—Jack M. Wiseman

[57] ABSTRACT

A stove includes a housing having side-by-side chambers each of which may be alternately used either as a firebox or an oven. One chamber is located directly under a grill while the other chamber is located under a griddle so that the location of the fire can be selected to obtain the most advantageous heat-distribution for the type of cooking engaged in—but the arrangement is such that no matter which firebox location is selected, both the grill and the griddle are heated to some extent.

8 Claims, 5 Drawing Figures

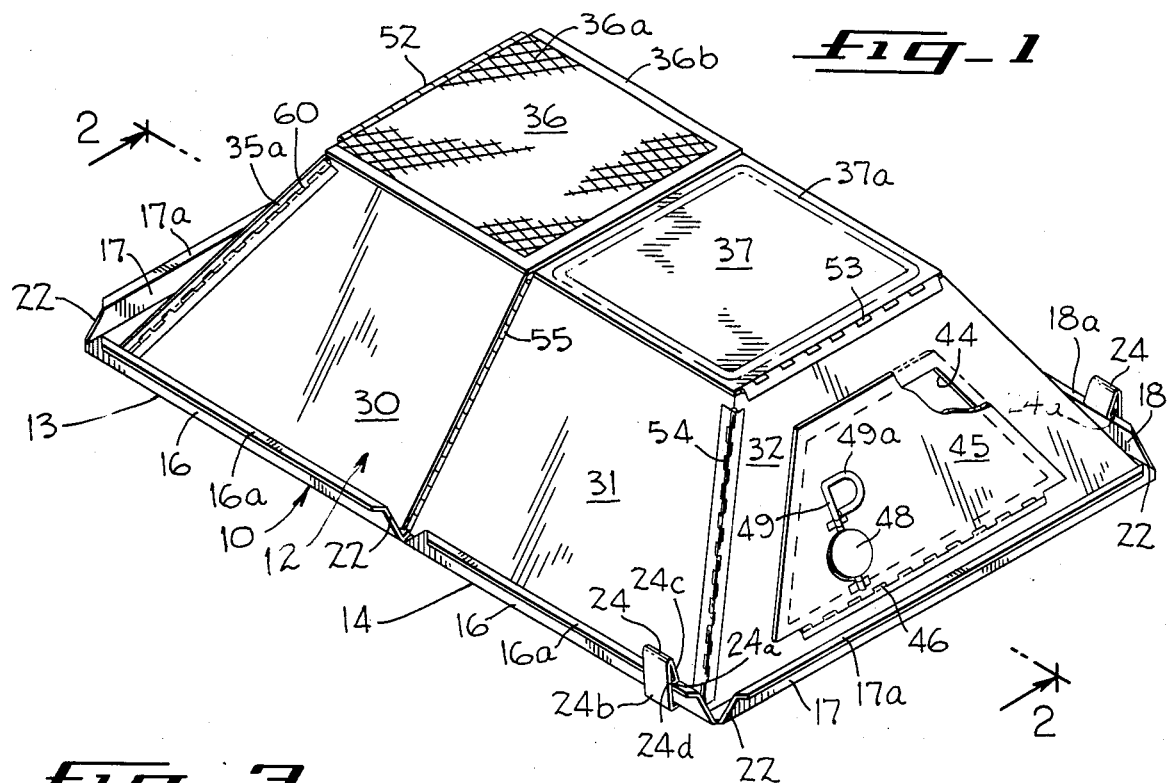
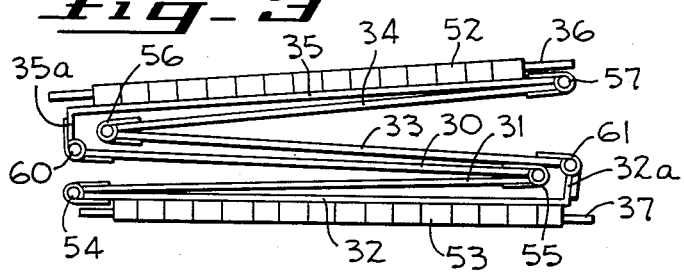
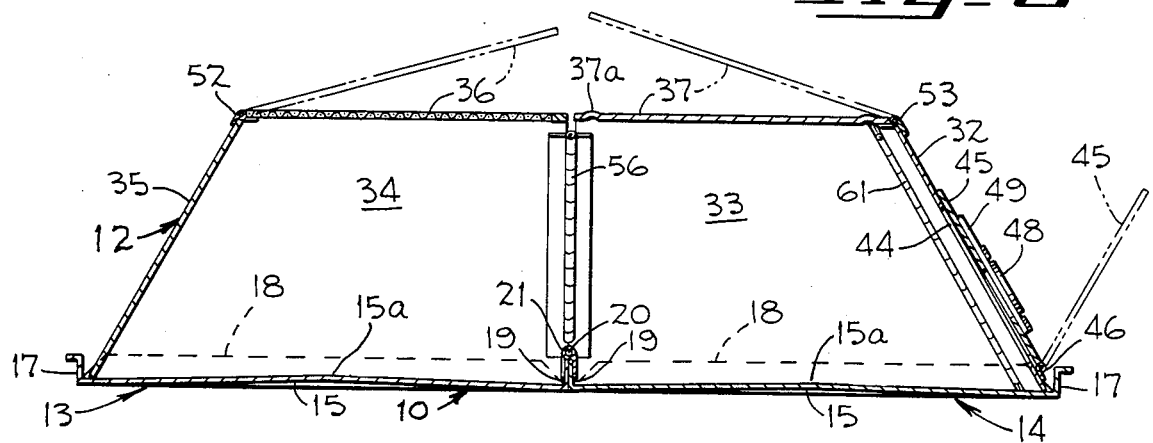

OUTDOOR STOVE

BACKGROUND OF THE INVENTION

Various types of stoves have been proposed for use in the outdoors and many have provided means for folding some of the elements relative to each other to form a package that would relatively be easy to transport. One of these stoves is disclosed in my copending applications, Ser. No. 296,879, Ser. No. 378,111 and Ser. No. 440,984. In each of these applications there is disclosed a firebox that has the configuration of a frustum of a pyramid and has a grill disposed across its open upper end. This has proven to be a very effective cooking unit, however, it has a limited amount of cooking surface and the use of that surface is restricted to whatever kind of cooking or heating that can be done over a grill.

It is an object of the present invention to provide a stove that provides a plurality of cooking surfaces at least one of which is a griddle. Another object is to provide a stove having a housing arranged so that parts of its interior can be used selectively as a firebox or as an oven.

SUMMARY OF THE INVENTION

The stove includes a frusto-pyramidal housing that has an elongated opening at its upper end, half of which is closed by a grill and the other half of which is closed by a griddle. Either of the chambers in the housing directly below the grill or the griddle may be used as a firebox so that the concentrated heat can be directed onto the grill or the griddle.

DESCRIPTION OF THE DRAWINGS

FIG. 1 is a diagrammatic perspective of the stove of the present invention.

FIG. 2 is a diagrammatic section taken along line 2—2 of FIG. 1.

FIG. 3 is a top plan view of the housing member of the stove in a partially folded condition.

FIGS. 4 and 5 are schematic showings of different ways the stove may be used for cooking purposes.

DESCRIPTION OF A PREFERRED EMBODIMENT

The stove of the present invention comprises a base 10 which also acts as a container, and a housing 12 that is adapted to enclose a fire on the base and support cooking utensils and items being cooked. The base includes two sections 13 and 14 each of which is rectangular in plan and has a central panel portion 15 (FIG. 2) enclosed by four wall members 16–19 that project at about a 90° angle from the edges of the panel portion. The panel 15 is a one-piece generally planar member formed in four triangular sections that slope slightly upwardly toward a central peak 15a. Each of the wall members 16, 17 and 18 has an out-turned flange 16a, 17a and 18a, respectively, at its free edge, while each of the two adjacent walls 19 has a plurality of spaced short tubular sections formed on its outer edge. The tubular sections of one wall 19 interdigitate with the sections of the other wall 19 to form a continuous tubular socket that receives an elongate pin 20 and provides a piano hinge 21 between the two sections of the base. It will be noted in FIG. 1 that the end of each of the wall members 16–18 terminates short of the end of an adjacent wall member so that a notch 22 is formed between the wall members. A pair of spring latches 24 is secured to the face of base section 14, each latch having a flange 24a welded to the panel, a rigid strap 24b extending up alongside the adjacent wall member 16 or 18, an inclined section 24c, and a flat ledge 24d. Ledge 24d is spaced above the flange 16a or 18a of the adjacent wall member a distance that is greater than the thickness of the flanges 16a and 18a of base section 13. Accordingly, when the section 13 is swung about hinge 21 down toward section 14, the flanges 16a and 18a engage the inclined sections 24c of the latches, and force the resilient latches to swing outward and permit the flanges 16a and 18a of section 13 to move into abutting contact with the flanges 16a and 18a of section 14. The resilient latches then swing back to position the ledges 24d of the latch over the flanges to lock the sections 13 and 14 together to form a container.

The housing 12 is made up of eight panels 30–37 each of which is a generally planar member hinged to an adjacent panel. The six panels 30–35 are trapezoidal in configuration while the panels 36 and 37 are square in configuration. Panels 30 and 33 are identical in size and configuration, and panels 31 and 34 are identical in size and configuration. End panels 32 and 35 are of the same size and have the same trapezoidal configuration. As seen in FIG. 3, panel 32 has a right-angle flange 32a extending along one edge, and panel 35 has a right-angle flange 35a extending along its edge. Panel 32 has an opening 44 covered by a charging door 45 that is pivotally mounted on the panel by a hinge 46. The door 45, in turn, has a circular opening over which a circular damper 48 is positioned by means of a shaft 49 that is secured to the damper and is pivotally mounted on the door. When the shaft 49 is pivoted by actuation of a handle 49a, the damper may be pivoted from a position generally parallel to the face of the door and closely overlying and substantially closing the opening in the door to a position at a desired angle to the plane of the door.

Panel 36 comprises a rigid, expanded metal grid 36a that has a thin sheet metal edging 36b folded over three of its side edges, and a piano hinge 52 is connected to the fourth side edge to pivotally mount plate 36 on end plate 35. In the operative position shown in FIG. 1, the plate 36 rests on the upper edges of the panels 30 and 34 and extends about half way across the opening at the top of the housing.

The plate 37 is a solid state of generally square configuration that has a raised rib 37a extending entirely around the upper surface of the plate close to its periphery. Along one edge the plate is connected to end plate 32 by a hinge 53.

Panel 30 is connected to panel 31, and panel 34 is connected to panel 33 by typical piano hinges 55 and 56 respectively. Similarly, the hinge 54 that connects panels 31 and 32 and hinge 57 that connects panels 35 and 34 are piano-type hinges. The hinge 60, that connects panels 30 and 35, is also a typical piano hinge but, instead of being secured to the edges of the body portions of both panels, hinge 60 is secured between the edge of the right angle flange 35a and the edge of the body portion of panel 30. As seen in FIG. 3, this arrangement provides a space between panels 35 and 30 into which the panels 34 and 33 and hinge 56 can be folded. Similarly hinge 61, that connects panels 32 and 33, is connected between the continuous flange 32a of panel 32 and the edge of the body portion of panel 33 to form a space into which panels 30 and 31 and hinge 55 may be folded.

The position of FIG. 3 is a partially folded position. It will be understood that, in the fully folded position, the panels are disposed in close, flat, abutting relation and that in this completely folded condition, the entire housing can be enclosed in the container that is provided when the sections 13 and 14 are swung into latched engagement.

In FIGS. 4 and 5 are shown some of the several ways in which the stove can be used. In this discussion, panel 36 will be referred to as a grill and panel 37 will be referred to as a griddle. The chamber under the grill 36 is identified by reference letter A, and the chamber below the griddle 37 is identified by reference letter B. If a fire is built on base 10 directly below grill 36, chamber A becomes a firebox and chamber B becomes an oven. Heated gases rise directly upwardly to cook meat or the like disposed on grill 36. These rising gases also contact the inner side walls of panels 30, 35 and 34 that enclose the firebox A to heat these walls. Oven B becomes heated, chiefly by radiation, and becomes an oven. Accordingly, while items are being heated on the grill 36, biscuits and the like can be baked in oven B, and other items such as food in cans can be heated in the oven. Also, the griddle 37 becomes heated and heat will be transmitted to items placed on the griddle, such as a pot of water. At the same time slices of bread, that are supported on the ledge provided by the upstanding wall members 16, 17 and 18 of the base and lean against the walls of the housing, can be toasted.

If a fire is made under griddle 37, as shown in FIG. 5, chamber A becomes an oven and chamber B becomes a firebox. Hot gases move upwardly to heat the griddle. Also, gases flow into the oven A to bake or heat items in the oven. As the gases pass out through grill 36, they heat items disposed on the grill. Again, bread can be toasted by positioning slices on the ledges formed by wall members 16, 17 and 18. It will be noted in FIG. 5 that, when a fire is made under griddle 37, it is protected from rain and wind.

While a stove having slanted side walls is disclosed it should be understood that the stove could have straight, upright side walls. Also, while the grill and the griddle of FIG. 1 are the same size and cover half the opening at the upper end of the housing, they may be made in different proportions, for example, the grill could cover two-thirds of the opening while the griddle covers one-third.

It will be evident that the stove provides a versatile unit which can be utilized in different ways depending upon the type of cooking that is desired. While certain items to be grilled may require the relatively intense heat obtained when the fire is built in chamber A, other items may be adequately heated on the grill when they are subjected to the less intensive heat of a fire in chamber B. Similarly, best grilling results are obtained when chamber B is a firebox—but some items placed on the grill can be adequately heated by the heat generated in chamber B by a fire in chamber A. Accordingly, the stove not only provides two cooking surfaces, but also means for cooking in different ways such as either grilling or griddling and, with either arrangement, an oven is provided.

I claim:

1. A stove comprising an imperforate base and a housing disposed on said base, said housing including opposing pairs of side panels, end panels and top panels; each side panel of each pair of side panels being pivoted to another side panel and to one of said end panels, and each of said top panels being pivotally connected to one of said end panels, whereby said housing can be moved to a collapsed position with each pair of pivotally-connected side panels pivoted into face-to-face contact with each other, each end plate being pivoted into face-to-face contact with one of said side panels, and each of said top panels pivoted into face-to-face contact with the end panel to which it is pivotally attached.

2. The stove of claim 1 wherein said base includes two plates pivotally connected together for movement into spaced generally parallel relation, each plate having a flange projecting outwardly from its side margins, the flanges on one base plate being disposed in generally planar alignment with the flanges on the other base plate when said plates are moved to parallel relation to define a compartment enclosed by said flanges and said plates, said compartment being adapted to receive and enclose said housing in collapsed position.

3. A stove as claimed in claim 2 and comprising means interengaging said plates on said base when said plates of said base are moved into spaced generally parallel relation to define a compartment enclosed by said flanges for retaining said plates of said base in the spaced generally parallel relation.

4. A stove as claimed in claim 3 wherein said means interengaging said plates of said base is a yieldable latch, said yieldable latch yields in response to said plates of said base being moved into spaced generally parallel relation for the flange of one plate of said base to abut the flange of the other plate of said base, said yieldable latch returns toward its initial position under its yieldable action to engage abutting flanges of said plates of said base to retain said plates of said base in the spaced generally parallel relation.

5. The stove of claim 1 further comprising means defining an opening in one of said end walls, and an access door pivoted on said one end wall from a position covering said opening to a position spaced from said opening.

6. The stove of claim 5 further comprising means defining an air-inlet opening in said access door, and a closure member pivotally mounted on said door and movable to a position substantially closing said air-inlet opening.

7. A stove comprising a housing having an elongate opening at its upper end, a grill positioned over a portion of said opening, and a griddle positioned over another provided of the opening, said housing comprising an enclosed firebox underlying said elongate opening, said firebox being formed with a bottom wall having a plurality of panels underlying respectively said grill and said griddle, each of said panels being selectively usable at times as a panel for heating food and at other times as a panel for burning fuel, said opening being approximately twice as long as it is wide, said grill and said griddle respectively being generally square in configuration and covering approximately one-half of said opening, said housing being frusto-pyramidal in configuration, said panels being pivotally connected.

8. A stove comprising a housing having side and end walls enclosing a firebox and a top wall having an imperforate section overlying the fuel-burning area of the firebox, said housing having a frusto-pyramidal configuration, means defining an opening in said top wall at one side of said imperforate section, and means defining an air-inlet opening in a wall of said housing located on the opposite said of said imperforate section from said top wall opening, said firebox being formed with a bottom wall having a plurality of panels, each of said panels being selectively usable at times as a panel for heating food and at other times as a panel for burning fuel, said panels being pivotally connected.

* * * * *